United States Patent [19]

Sagara et al.

[11] Patent Number: 5,050,587
[45] Date of Patent: Sep. 24, 1991

[54] VIBRATOR SYSTEM AND VIBROTHERAPEUTIC DEVICE USING THE SAME

[75] Inventors: Shinji Sagara, Kitamoto; Youichi Endo, Tokyo, both of Japan

[73] Assignees: Kabushiki Kaisha Hayashibara Seibutsu Kagaku Kenkyujo, Okayama; Kabushiki Kaisha Fukoku, Saitama, both of Japan

[21] Appl. No.: 216,560

[22] Filed: Jul. 8, 1988

[30] Foreign Application Priority Data

Jul. 8, 1987 [JP] Japan .................. 62-170375
Oct. 14, 1987 [JP] Japan .............. 62-156190[U]
Oct. 14, 1987 [JP] Japan .............. 62-156191[U]
Nov. 16, 1987 [JP] Japan .................. 62-287413
Dec. 12, 1987 [JP] Japan .............. 62-189030[U]

[51] Int. Cl.⁵ .............................. A61H 1/00
[52] U.S. Cl. .................. 128/24 AA; 128/33; 128/39; 128/41; 310/323
[58] Field of Search ............ 128/24 R, 24 A, 24.2, 128/24.4, 24.5, 32, 41, 33, 38, 39, 48–55, 64, 67, 36, 660.01, 660.03; 310/323, 366, 116

[56] References Cited

U.S. PATENT DOCUMENTS

| | | | |
|---|---|---|---|
| 4,232,661 | 11/1980 | Christensen | 128/33 |
| 4,343,303 | 8/1982 | Williams | 128/36 X |
| 4,354,067 | 10/1982 | Yamada et al. | 128/33 X |
| 4,697,581 | 10/1987 | Endo et al. | 128/41 |
| 4,827,914 | 5/1989 | Kamazawa | 128/41 X |
| 4,853,579 | 8/1989 | Kawasaki et al. | 310/116 |

FOREIGN PATENT DOCUMENTS 1127590 12/1984 U.S.S.R. .................. 128/24.4

Primary Examiner—Richard J. Apley
Assistant Examiner—Joe H. Cheng
Attorney, Agent, or Firm—Browdy and Neimark

[57] ABSTRACT

Disclosed is a novel vibrator system which comprises an ultrasonic motor; a driver circuit which supplies a forwardly-rotatory and reversely-rotatory signals to the ultrasonic motor; and a switching control circuit wich alternately switch the signals. The vibrator system attains a high energy efficiency even when miniaturized, as well as normally working without causing a large operation noise when loaded. The vibrotherapeutic device wherein the vibrator system is assembled can be advantageously used to massage human body.

16 Claims, 8 Drawing Sheets

VIBRATOR SYSTEM AND VIBROTHERAPEUTIC DEVICE USING THE SAME

BACKGROUND OF THE INVENTION

1. Field of the Invention

The present invention relates to a novel vibrator system using an ultrasonic motor as the power source, as well as to a vibrotherapeutic device using the vibrator system.

2. Description of the Prior Art

Local vibrostimulation to human body is effective in the shortening of sleep latency to treat insomnia, as well as in the relieving of pains in myalgia, lumbago, arthritis, rheumatism and stiffness in the shoulder.

In typical conventional vibrotherapeutic device, a vibratile plate is actuated by using a conventional-type magnetic motor in combination with an eccentric weight or a cam mechanism. Such vibrotherapeutic device has the drawbacks that it becomes long and unwieldy in a direction of the rotary axis of the motor: that it attains an unsatisfactorily low energy efficiency because it yields an small output energy with respect to the inputted energy; and that it does not adequately work when the load descend the vibratile plate to restrict the operative range of the cam mechanism.

To avoid these drawbacks of conventional vibrotherapeutic device, Japanese Patent Laid-Open Nos. 209,284/85 (Y. ENDO et al), 216,870/85 (Y. ENDO et al) now U.S. Pat. No. 4,697,581 and 5,359/87 (K. MASAKI) now U.S. Pat. No. 4,710,655 propose a system wherein a magnetic coil placed in parallel with a coil or a vibratile member is intermittently energized with an alternating current through a charge/discharge circuit using a thyristor and a capacitor in combination and the resultant attraction and repulsion are used to generate a vibration, while Japanese Patent Publication No. 10,145/86 (Y. ENDO) proposes a system to vibrostimulate human body wherein an amplified signal from an audio frequency oscillator is used to actuate a sound generating means such as loudspeaker.

These proposals have, however, proved unsuccessful: The former system using a coil and a charge/discharge circuit frequently encounters the drawback that it consumes a large amount of electric energy. While the latter system using a sound generating means such as loudspeaker has the advantage that its vibration frequency is easily changeable, but becomes unwieldy and attains an unsatisfactory low energy efficiency because it requires a large-scale power source in order to obtain a sufficiently strong sound pressure on the vibratile plate that is in contact with human body.

SUMMARY OF THE INVENTION

In view of the foregoing, one object of the present invention is to provide a vibrator system which can attain a high energy efficiency even when miniaturized.

Another object of the present invention is to provide a vibrotherapeutic device using such vibrator system.

The present inventors investigated various means using ultrasonic motor, which is recently highlighted particularly in Japanese Patent Application No. 62-12350, U.S. Pat. No. 4,562,374 (T.Sashida) and Japanese Patent Application No. 12,350/87 (S. Sagara).

As the result, these and other objects as may become apparent hereinafter have been attained with a vibrator system comprising an ultrasonic motor: a driver circuit which supplies a forwardly-rotatory and a reversely-rotatory signals to the ultrasonic motor: and a switching control circuit which alternately switches the signals.

The following will explain the present invention in more detail.

Hitherto known are travelling wave type and standing wave type ultrasonic motors, which are advantageously usable in the invention as long as a vibration is generated by switching their output shaft to forward and reverse rotations.

Travelling wave type ultrasonic motor is designed in such manner that a piezoelectric or electrostrictive electrode divided into at least two sections is applied with a high-frequency voltage having a phase difference of about 90° to generate on the stator a travelling wave which actuates the rotator.

To generate a vibration at the output shaft of an ultrasonic motor which intrincically effects a rotary movement, for example, the ultrasonic motor is applied with a high-frequency voltage while switching it alternately to a state having a phase difference of +90° and another state having a phase difference of −90°, thereby switching the output shaft to forward and reverse rotations to bring it into vibration.

To switch a high-frequency voltage alternately to a state having a phase difference of +90° and another state having a phase difference of −90°, for example, a circuit which effects +90° phase conversion and another circuit which effects −90° phase conversion are assembled in a phase converter circuit in such manner that they can be switched with a forward/reverse switching circuit, while the forward/reverse switching circuit is continuously switched at a high speed with a pulse input from an oscillator.

Another type of vibration can be obtained by gradually switching the phase converter circuit along with a sinusoidal curve using a phase control circuit in place of a switching circuit: or by supplying to the phase converter circuit either of (i) an audio signal from an AM receiver, FM receiver, video tape recorder, laser disc player, tape recorder, disc player, compact disc player, or digital audio tape recorder, (ii) a signal having a restricted frequency range obtained by passing the audio signal through filter(s), and (iii) a pulse signal obtained with a pulse generator such as multivibrator.

The above arrangement is to rotate travelling wave type ultrasonic motor in forward and reverse directions. Standing wave type ultrasonic motor is similarly operable by providing a driver circuit capable of generating forwardly-rotatory and reversely-rotatory signals, and continuously controlling the driver circuit with a switching control circuit.

The vibrator system arranged in this manner can be advantageously used in or for vibrotherapeutic devices.

To vibrostimulate human body with a vibration obtained with the vibrator system, the vibration is transmitted from the output shaft of an ultrasonic motor to a vibratile plate capable of supporting human body, or to that which can be placed or attached onto human body.

To actuate such vibratile plate while allowing it to support human body, for example, one end of an arm member is attached to the output shaft of an ultrasonic motor, while the other end of the arm member is connected with the vibratile plate while supporting the latter end with an elastic member in such manner that the latter end does not descend to an undesirable level when loaded. Although in this case the output shaft rotationally moves by a small angle through the arm member, such movement never hinders the ultrasonic motor from yielding a prescribed vibration because in the ultrasonic motor the rotator rotates while receiving a travelling wave occurred on the stator.

In case that an inertial member and its cover are attached respectively to the output shaft of an ultrasonic motor and, through a damping member, to its case, a strong inertia acts on the output shaft and the ultrasonic motor receives in turn the counteraction. Thus, the resultant vibration is amplified to a level strong enough to vibrate the cover per se.

In case that a diaphragm is attached to the output shaft of an ultrasonic motor and the peripheral edge of the diaphragm is fixed to a supporting plate attached to the case of the ultrasonic motor, a vibration generated by forward and reverse rotations of the output shaft is amplified by the diaphragm to a level strong enough to entirely vibrate this system. More particularly, since in this case the direction of the rotatory power acting towards the center of the diaphragm is contrary to that of the counter rotatory power acting towards the peripheral part of the diaphragm, an amplified vibration is obtainable.

An amplified vibration is also obtainable with an arrangement wherein an inertial disc is attached to the output shaft of an ultrasonic motor and a diaphragm is fixed to the output shaft and the case of the ultrasonic motor respectively at its center and peripheral part. Since in this arrangement, when the ultrasonic motor is continuously switched to forward and reverse rotations with a switching control circuit, the inertial disc quickly turns in a direction opposite to that of the forward or reverse rotation, the inertial disc is brought into vibration by repeating such turning. In this case, the bottom surface of the diaphragm can be brought into contact with the inertial disc so that its vibration transmits to the diaphragm. A much stronger vibration is obtainable by interposing an elastically deformable member between the output shaft, and the inertial disc and diaphragm.

This arrangement has the feature that the diaphragm can be adequately placed on a prescribed site of the subject's body even when eccentrically loaded with the subject's body because the inertial disc is imparted with a room for declination with respect to the axis of the output shaft by attaching the inertial disc to the output shaft through the elastic member.

Two or more subjects who may be at a distance can be simultaneously vibrostimulated by communicating a vibratile plate such as diaphragm with another vibratile plate, which is placeable or attachable onto human body, through a vibration transmissible member such as gases and liquids including air, carbon dioxide, water and oil: or by communicating the output shaft of an ultrasonic motor with a vibratile plate through a vibration transmissible member such as wire.

Since the vibrator system using ultrasonic motor as the power source never become unwieldly, it can be freely assembled in or on a supporting member of an appropriate shape, for example, blanket, "futon (thick bed quilt)", "zabuton (a cushion)", mattress, vest, "tanzen (a padded kimono)", belt, "obi (a belt for kimono)", cap, hat, slippers, shoes, helmet, chair, bed, mat, bed sheet, cushion, and driver's seat to locally or systemically vibrostimulate human body. Such vibrostimulation helps to relax and improve the muscle and blood circulation, and this is very effective in the shortening of sleep latency, dehypnotization, relieving and stopping of pains and spasms in myalgia, lumbago, arthritis, rheumatism and asthma, mental and physical relaxation, and warming-up and massaging before and after playing sports. In particular, a vibrostimulation, administered with a supporting member attachable to the head, such as that in the shape of hat, cap or helmet, effectively massages the scalp to extremely promote the regeneration and growth of hair. In the case of using a hair restorer, such as KANKHO-SO 310, an aminovinyl photosensitizing dye chemical formula of 6-[2-[(5-bromo-2-pyridyl)amino]vinyl]-1-ethyl-2-picolinium iodide commercialized by Nippon Kankoh-Shikiso Kenkyujo Co., Ltd., Okayama, Japan, in combination, the hair restorer and vibrostimulation act synergetically on the scalp to attain an extremely high promoting effect. A specific site of human body can be more strongly vibrostimulated by placing the vibratile plate of a vibrator system onto such site through an elastic member such as sponge, rubber and foam synthetic resin.

In use, the vibrotherapeutic device of the invention is placed, for example, on "futon", "tatami (a straw matting)", chair, bed, floor, or directly on the ground, and, if necessary, covered with a sheet, after which the subject is allowed to lie thereon, followed by vibrostimulation. Alternatively, the vibratile plate of the device is placed or attached onto a specific site of human body, followed by vibrostimulation. In either case, it is recommendable to continuously or continually administer a vibration, frequency usually in the range of 10-200 hertz, desirably, 50-80 hertz or 100-120 hertz, while carefully monitoring the state of the subject. When vibration is continually administered, the use of a timer is favorable.

As described heretofore, the vibrotherapeutic device of the invention is characterized in that the user can freely chose a vibration having an appropriate waveform in accordance with the use because the device can generate a vibration with a sinusoidal waveform, as well as generating that in a pulse waveform.

DESCRIPTION OF THE PREFERRED EMBODIMENTS

At first, the driver circuit and the switching control circuit to actuate travelling wave type ultrasonic motor will be explained with reference to FIGS. 1 and 2.

Piezoelectric or electrostrictive electrode (2) in ultrasonic motor (1) is divided into two electrode sections (3)(4) so that application of a high-frequency voltage having a phase difference of 90° (a half of the wavelength) generates a travelling wave on a stator which electrode (2) is attached to. The rotator (not shown) is placed on the stator by applying a pressure in such manner that the resultant travelling wave on the stator actuates the rotator to bring the output shaft of ultrasonic motor (1) into vibration.

Figure 1:
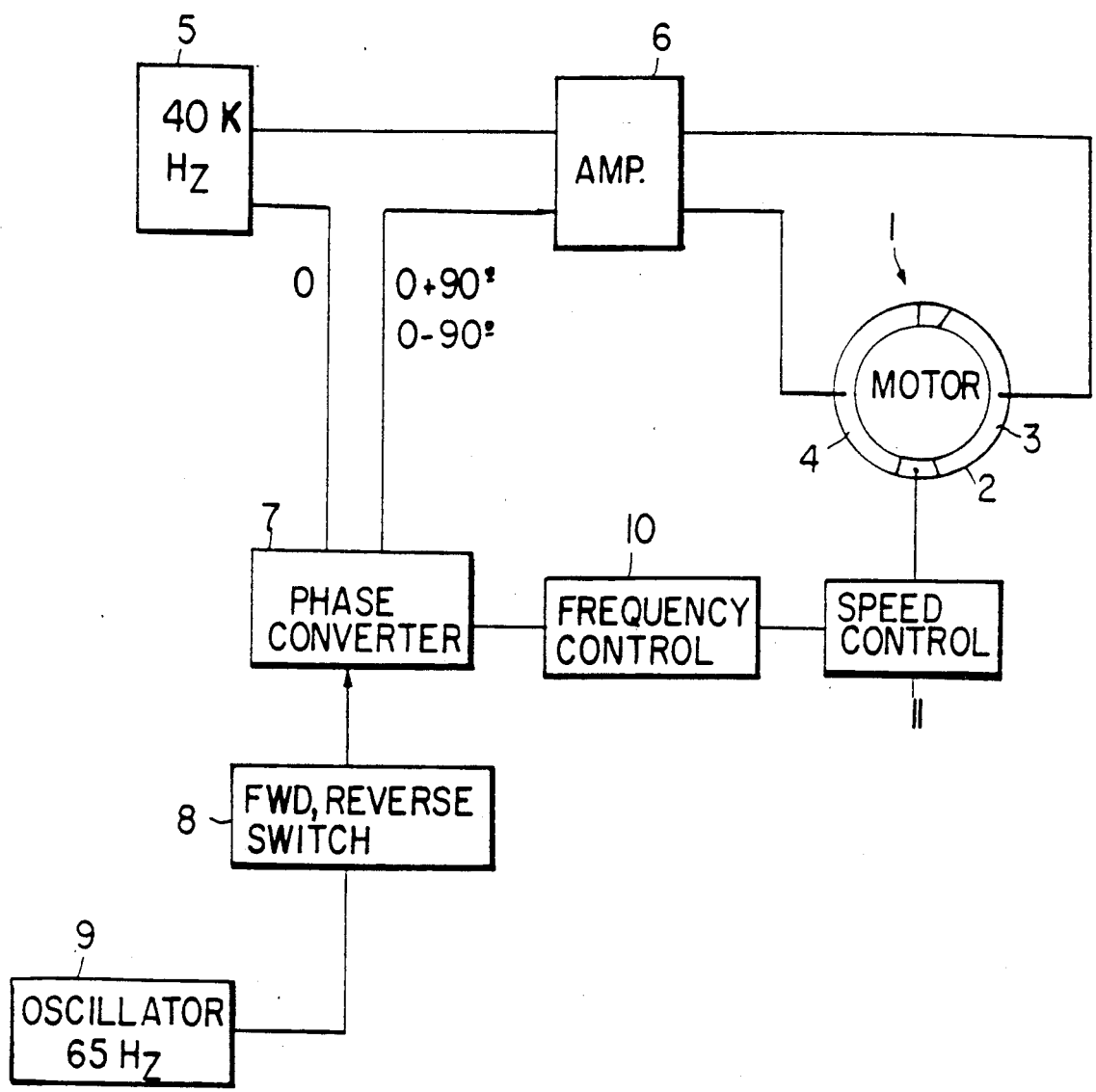
FIG. 1 is the block diagram of a driver circuit to actuate ultrasonic motor.

As shown in FIG. 1, in the driver circuit one electrode section (3) is connected with high-frequency voltage source (5), frequency, for example, of 40 kilohertz, through amplifier (6), while the other electrode section (4) is connected with high-frequency voltage source (5) through phase converter circuit (7). Phase converter circuit (7) is to convert the phase of a high-frequency voltage by +90°, prior to inputting it to amplifier (6).

Phase converter circuit (7) contains an antiphase converter circuit capable of converting the phase of a high-frequency voltage from high-frequency voltage source (5) by −90°. When applied with a high-frequency voltage which has undergone −90° phase conversion, electrode section (4) rotates ultrasonic motor (1) in a direction opposite to that in the case of applying a high-frequency voltage which has undergone +90° phase conversion.

Phase converter circuit (7) is switchable to +90° phase conversion and −90° phase conversion in accordance with a signal from forward/reverse switching circuit (8). Forward/reverse switching circuit (8) is continuously switchable at a high speed by inputting thereto a pulse signal, frequency, for example, 65 hertz, from oscillator (9) to yield output signals respectively for +90° phase conversion and −90° phase conversion. A high-speed switching of ultrasonic motor (1) to forward and reverse rotations generates at its output shaft a vibration of the same frequency as that in the pulse signal.

Although in the above embodiment ±90° phase conversion is effected, the output shaft of ultrasonic motor (1) can be vibrated with any level of phase conversion. A vibration of another waveform can be obtained by providing a phase control circuit not shown in place of forward/reverse switching circuit (8) and oscillator (9) to convert an output of phase converter circuit (7) from +90° phase conversion into +180° phase conversion, for example, along with a sinusoidal curve or an appropriate pulse signal.

The switching period of phase converter circuit (7) is changed with frequency controlling circuit (10), which is inputted with an appropriate signal from speed controlling circuit (11) in accordance with the operation of ultrasonic motor (1).

Figure 2:
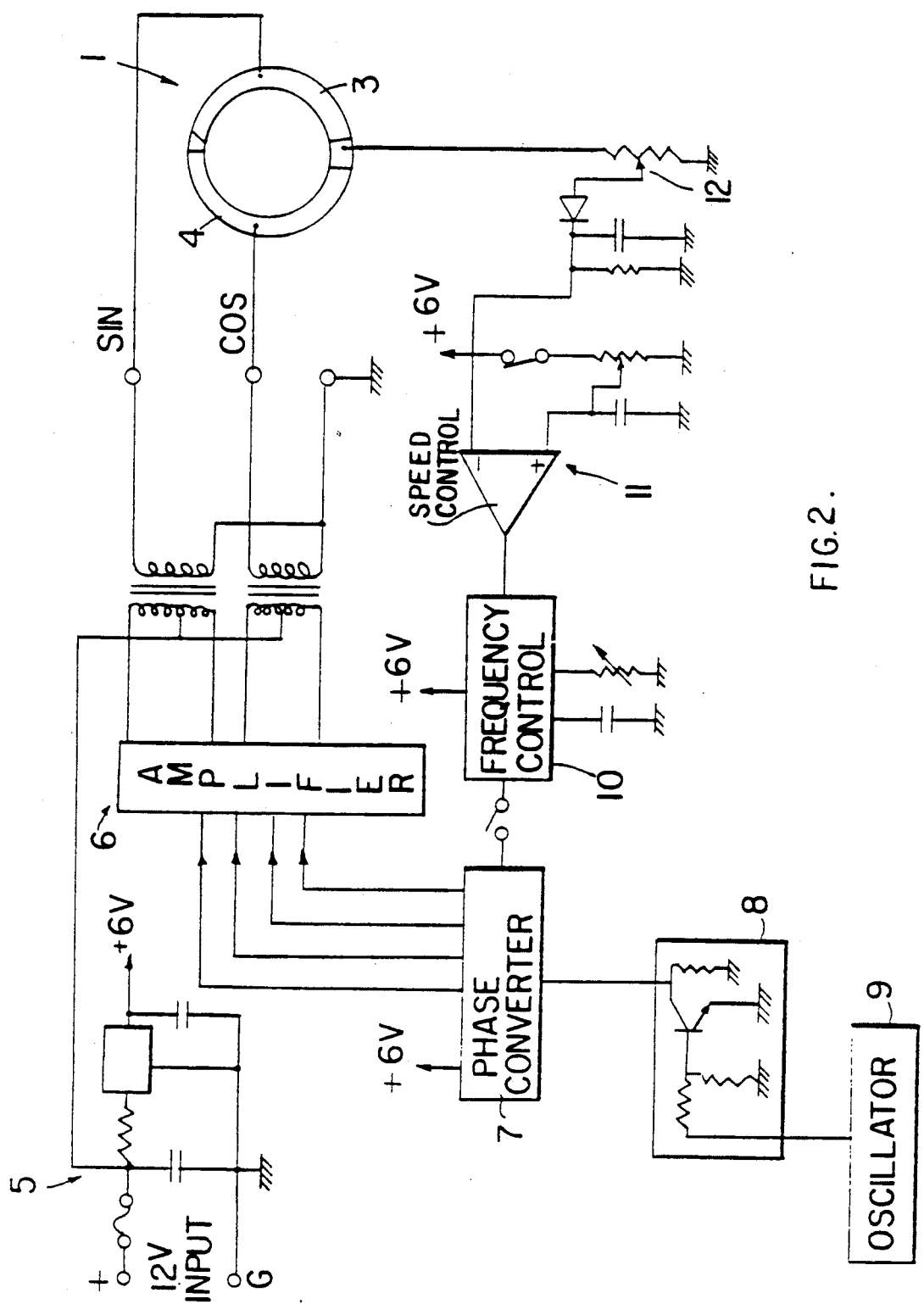
FIG. 2 is the detailed driver circuit to actuate ultrasonic motor.

FIG. 2 is the detailed driver circuit to actuate ultrasonic motor (1). A voltage of 6 volts is supplied from high-frequency voltage source (5) to phase converter circuit (7), frequency controlling circuit (10) and speed controlling circuit (11). Phase converter circuit (7) alternately outputs a high-frequency voltage that has undergone +90° phase conversion and another high-frequency voltage that has undergone −90° phase conversion to energize through amplifier (6) electrode sections (3)(4) with high-frequency voltages having a sine or cosine waveform that differ in phase by ±90° each other. A voltage that varies with a travelling wave arising in ultrasonic motor (1) is inputted to speed controlling circuit (11) through variable resistor (12) provided to control the voltage.

The above description is illustrative of a driver and a switching control circuits directed to actuate travelling wave type ultrasonic motor. In the case of standing wave type ultrasonic motor, a driver circuit and a switching control circuit having a different circuit arrangement are used similarly as in the case of travelling wave type ultrasonic motor. The switching control circuit is to switch an output from the driver circuit in accordance with the forward and reverse rotations of standing wave type ultrasonic motor.

The following will explain four types of vibrator system using the above described ultrasonic motor.

Figure 3:
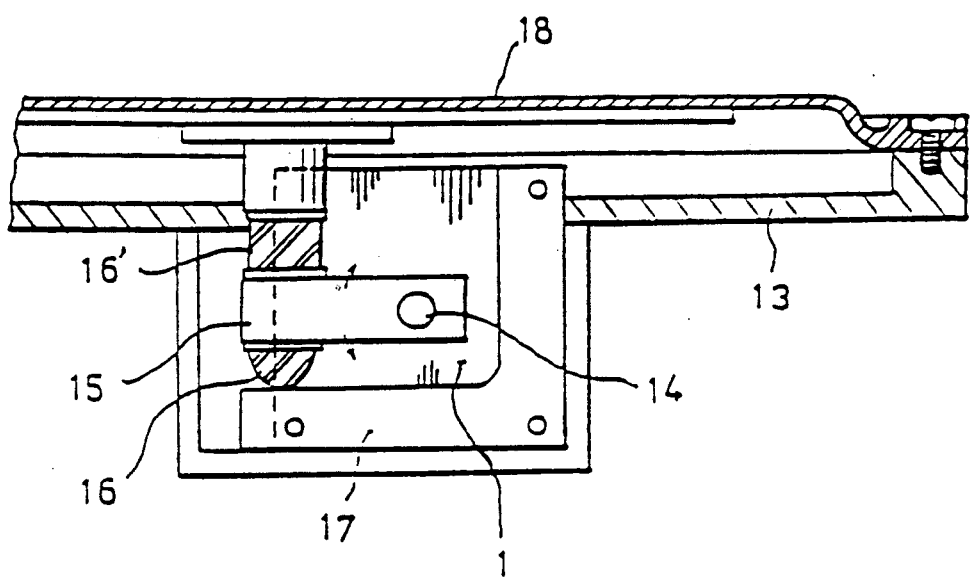
FIGS. 3 and 4 are the cross sectional views of vibrator systems according to the invention.

In the embodiment as shown in FIG. 3, ultrasonic motor (1) is fixed on the lower side of horizontally provided supporting base (13), and one end of arm member (15) is attached to output shaft (14) of ultrasonic motor (1). Arm member (15) is provided horizontally, and its upper and lower sides are attached with elastic members (16)(16') of rubber or synthetic resin. Supporting member (17) fixed on supporting base (13) is provided on the lower side of lower elastic member (16) so that the end of arm member (15), which locates at the side of lower elastic member (16), does not descend to an undesirable level. Vibratile plate (18) is attached to the upper side of upper elastic member (16') through a connecting member. Vibratile plate (18) is prepared with a diaphragm comprising a lower elastic member and an upper metal plate smaller than the diaphragm, and the diaphragm is fixed only at its peripheral part on supporting base (13).

When output shaft (14) of ultrasonic motor (1) vibrates, vibratile plate (18) is actuated through arm member (15) and elastic member (16'). Thus, this vibrator system is usable to vibrostimulate the subject's body by allowing the subject to lie on vibratile plate (18), or placing vibratile plate (18) onto the subject's body. Although vibratile plate (18) descends and arm member (15) slightly trembles to rotationally move output shaft (14) of ultrasonic motor (1) when the subject lies on vibratile plate (18), ultrasonic motor (1) still yields a prescribed vibration because in ultrasonic motor (1) the rotator rotates while receiving a travelling wave from the stator.

Figure 4:
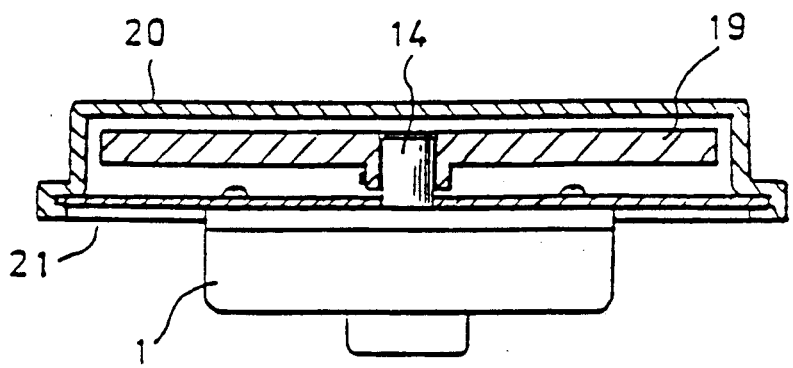

In the embodiment as shown in FIG. 4, inertial member (19) is attached to output shaft (14) of ultrasonic motor (1) that can be driven similarly as in the embodiment in FIG. 3, and cover (20) of inertial member (19) is fixed on the case of ultrasonic motor (1) through damping member (21).

Inertial member (19) comprising, for example, a metal disc having a central boss screwed around output shaft (14) is arranged in such manner that, when output shaft (14) rotates in forward and reverse directions, the resultant inertia acts on output shaft (14) to amplify its vibration. Damping member (21) comprises a hard rubber plate or an elastic synthetic resin plate to efficiently transmit the vibration of ultrasonic motor (1) to cover (20).

Figure 5:
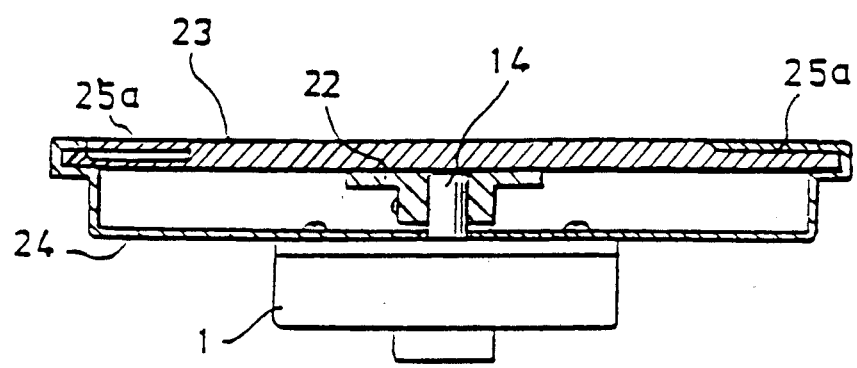
FIG. 5 is the cross sectional view of a vibrator system according to the invention.
Figure 6:
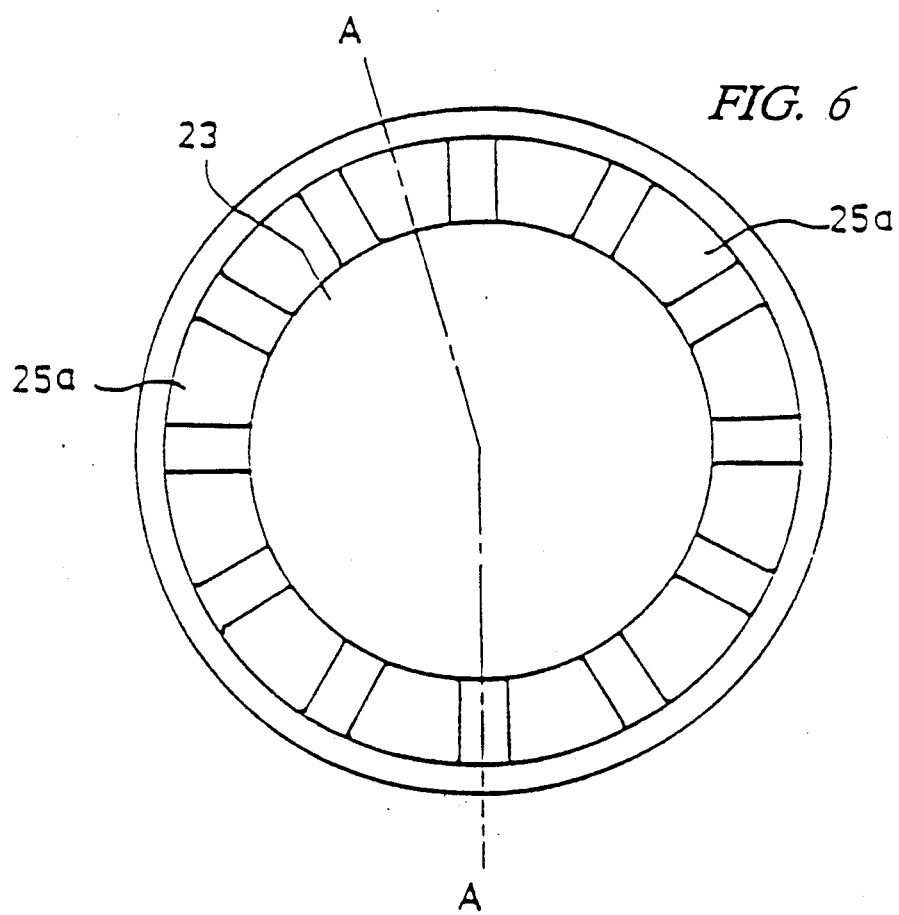
FIG. 6 is the plane view with the sectional line A—A in the vibrator system in FIG. 5.

In the embodiment as shown in FIGS. 5 and 6, diaphragm (23) is attached through metal fitting (22) to the end of output shaft (14) of ultrasonic motor (1) that can be driven similarly as in the embodiment in FIG. 3. Although in this embodiment diaphragm (23) is attached to metal fitting (23) by vulcanizing adhesion, it can be replaced with an adhesive or screwing. Supporting plate (24) is screwed on the case of ultrasonic motor (1), and the peripheral part of supporting plate (24) is flanged to fix the peripheral part of diaphragm (23) by nipping.

Diaphragm (23) is composed of an elastic material such as rubber and synthetic resin, while a plurality of cutaway (25a) is provided at its peripheral part as shown in FIGS. 5 and 6 to control the resonant frequency of the peripheral part of diaphragm (23) that is in fixation.

Figure 7:
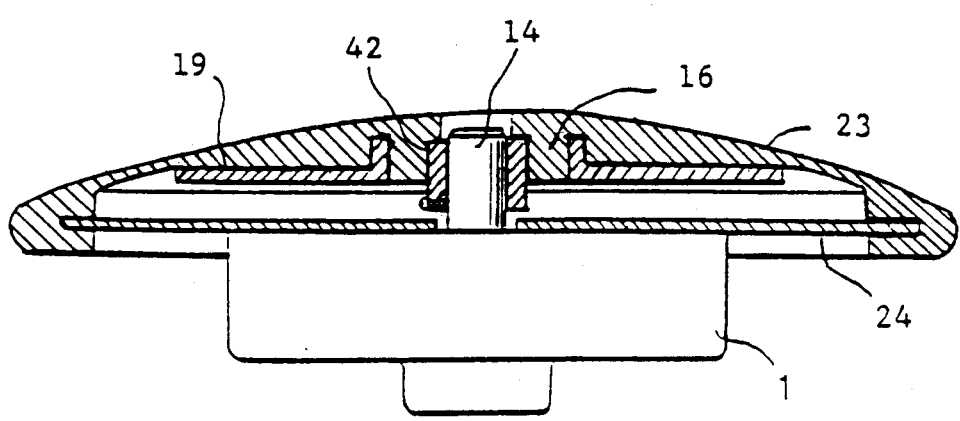
FIG. 7 is the cross sectional view of a vibrator system according to the invention.
Figure 8:
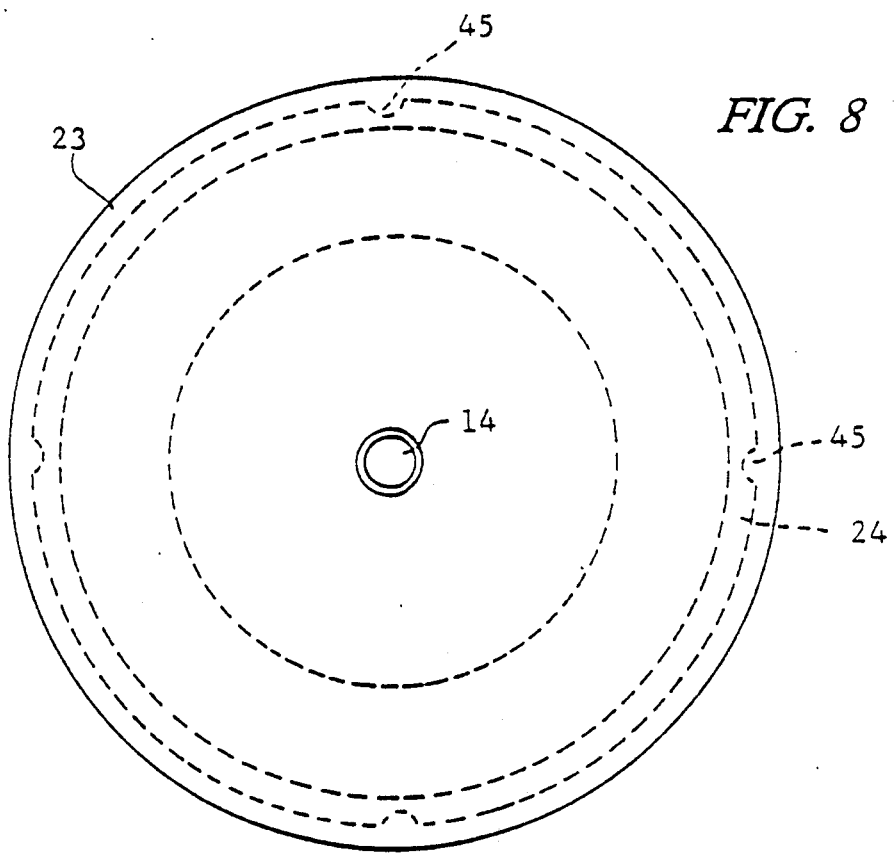
FIG. 8 is the plan view of the vibrator system in FIG. 7.

In the embodiment as shown in FIGS. 7 and 8, output shaft (14) of ultrasonic motor (1) that can be driven similarly as in the embodiment in FIG. 3 is inserted in cylindrical metal fitting (42) which is then screwed on output shaft (14). Metal fitting (42) is inserted in cylindrical elastic member (16) of rubber or synthetic resin, and then fixed thereon with an adhesive or vulcanizing adhesion. Inertial member (19) in disc shape is fixed around the periphery of elastic member (16) with an adhesive or vulcanizing adhesion. The center of diaphragm (23), which covers the outer surface of inertial member (19), is fixed to output shaft (14), while the peripheral part of diaphragm (23) is fixed to the case of ultrasonic motor (1) through supporting plate (24). The elastic deformability of elastic member (16) amplifies the vibration of inertial member (19) and diaphragm (23), as well as enabling a slight declination of inertial member (19). In this embodiment, elastic member (16) and diaphragm (23) are prepared into one body, and the center of diaphragm (23) is fixed to output shaft (14) through elastic member (16).

When ultrasonic motor (1) is allowed to effect forward and reverse rotations with the driver circuit and switching control circuit as described in FIGS. 1 and 2, inertial member (19) quickly turns in a direction opposite to that of the forward or reverse rotation to generate a vibration, while diaphragm (23) fixed to output shaft (14) and the case of ultrasonic motor (1) generates another vibration. These vibrations cooperate to yield a much stronger vibration.

Inertial member (19) is composed of a relatively heavy material such as metal, and its central cylindrical part is extensively and rigidly adhered to elastic member (16).

Diaphragm (23) of rubber or synthetic resin is imparted with a gently-sloped spherical outer surface, while the inside wall of diaphragm (23) is imparted with a sectional shape conforming to the shape of inertial member (19), so that inertial member (19) supports diaphragm (23) and the vibration of inertial member (19) transmits to diaphragm (23). The inside wall of diaphragm (23) and the upper side of inertial member (19) are located to leave a spacing which is brought into contact only through elastic member (16). The peripheral part of diaphragm (23) is thickened, and a groove to catch supporting plate (24) is provided in the peripheral part. The peripheral part is fixed by engaging a plurality of projection (45), provided in the groove, respectively with the concaves provided on supporting plate (24).

Six types of vibrotherapeutic device using a vibrator system as shown in FIG. 3-8 will hereinafter be described.

Figure 9:
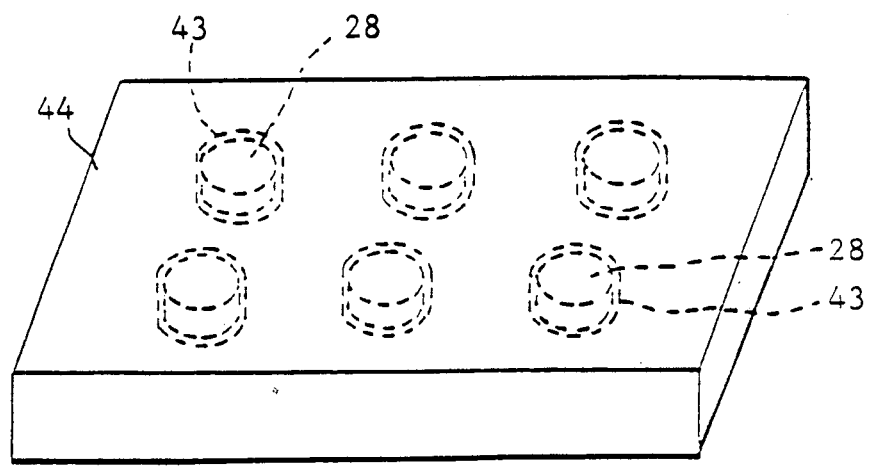
FIGS. 9 and 10 are the schematic perspective views of mat-type vibrotherapeutic devices according to the invention.

In the embodiment as shown in FIG. 9, a plurality of concave (43) is provided in thick supporting member (44) of an elastic material such as sponge, and vibrator system (18) as described heretofore is inserted in each concave. By actuating each vibrator system (28) to entirely vibrate supporting member (44), a specific site that is in contact with vibrator system (28) can be much strongly vibrated.

Figure 10:
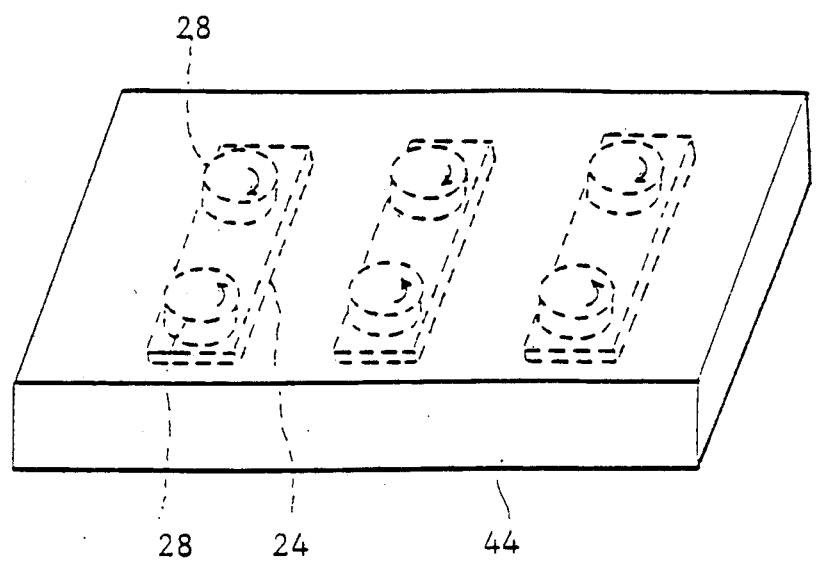

In the embodiment as shown in FIG. 10, two vibrator systems (28)(28) are attached to supporting plate (24). In this case, the input terminals of the ultrasonic motors in vibrator systems (28)(28) are connected with a high-frequency voltage source in such manner the ultrasonic motors rotate in opposite directions, as well as that vibrator systems (28)(28) exert appropriately the same effect in the left and right sides in human body.

Supporting plate (24) having two vibrator systems (28)(28) is placed in a hollow, provided in thick supporting member (44) of a sponge-like elastic body, to entirely vibrate supporting member (44) and also to more strongly vibrate a specific site that is in contact with vibrator systems (28) (28).

Figure 11:
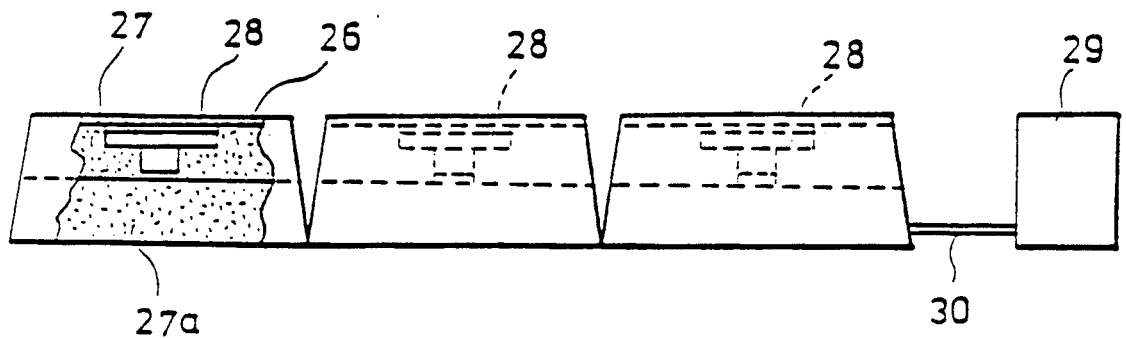
FIG. 11 is the partially cutaway side elevation view of a mat-type vibrotherapeutic device.

In the embodiment as shown in FIG. 11, a plurality of a vibrator system as described heretofore is assembled in a mat-type vibrotherapeutic device, which is spread on "tatami", "futon", bed, chair or floor when in use. The vibrotherapeutic device is imparted with a foldable structure comprising layered square-shaped sponge pieces (27)(27a), and elastic plate (26) rigider than the sponge pieces is provided on the upper side of upper sponge piece (27). A plurality of a vibrator system as shown in FIG. 4 or 5 is placed in holes provided in upper sponge piece (27). Vibrator system (28) is electrically connected through lead (30) with drive system (29) comprising a driving circuit and a switching control circuit in order to actuate vibrator system (28) at a frequency, for example, of 30-150 hertz.

Although in this embodiment vibrator system (28) is placed in sponge piece (27), vibrator system (28) can be removably attached to an appropriate position on sponge piece (27), for example, with a hook-and-loop type fastener in accordance with the size and site of the subject's body.

In use, the mat-type vibrotherapeutic devices in FIG. 9-11 are spread, for example, on "tatami", "futon", carpet, chair, floor or on the ground, and then allowed to locally or systemically vibrostimulate human body. Such vibrostimulation helps to relax and improve the muscle and blood circulation, and this is superiorly effective in the shortening of sleep latency, dehypnotization, and relief of pains and spasms in myalgia, lumbago, arthritis and rheumatism.

When the subject is in a healthy condition, the vibrotherapeutic devices are effectively used for shortening the sleep latency to induce a restful sleep, as well as for mentally and physically relaxing the subject.

Figure 12:
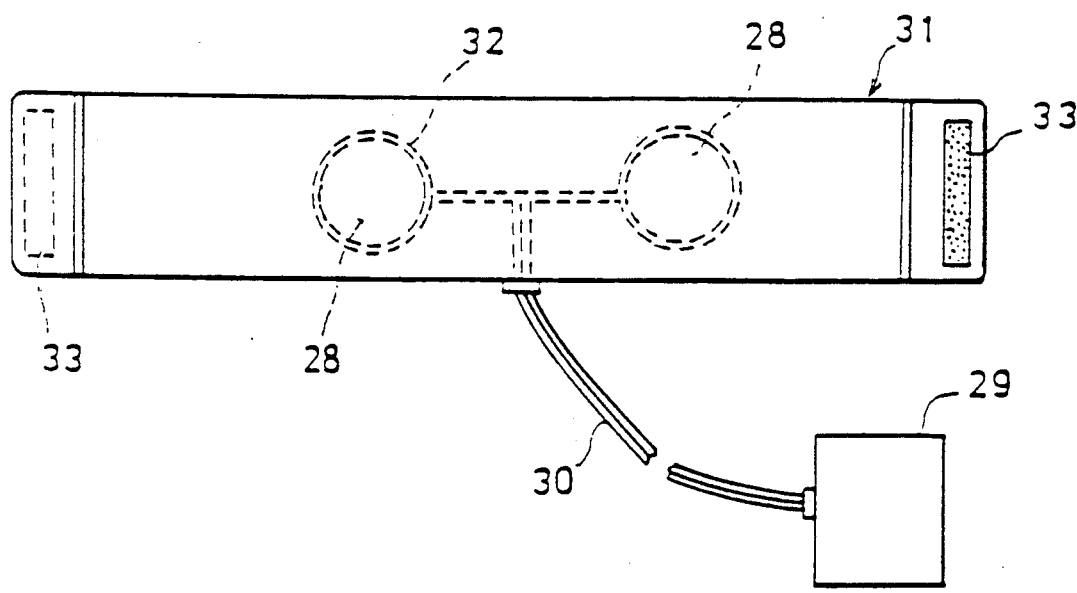
FIG. 12 is the front elevation view of a belt-type vibrotherapeutic device.

The embodiment as shown in FIG. 12 is a vibratile belt comprising a plurality of vibrator system (28) placed in belt member (31), which is wound around the arm or leg when in use. Vibrator system (28) is supported by supporting member (32) of an elastic material provided in belt member (31). Attaching member (33) such as hook-and-loop type fastener is provided at both ends of belt member (31), while vibrator system (28) is electrically connected with driver system (29) through lead (30).

In use, the vibratile belt is wound around the arm, leg or trunk to vibrostimulate it at a frequency in the range, for example, of 30-150 hertz. Such vibrostimulation helps to relax or improve the muscle and blood circulation, and this is effective in the shortening of sleep latency, dehypnotization, and relief of pains and spasms in myalgia, lumbago, arthritis and rheumatism.

The vibratile belt can be effectively used in warming-up and massaging before and after playing sports.

Figure 13:
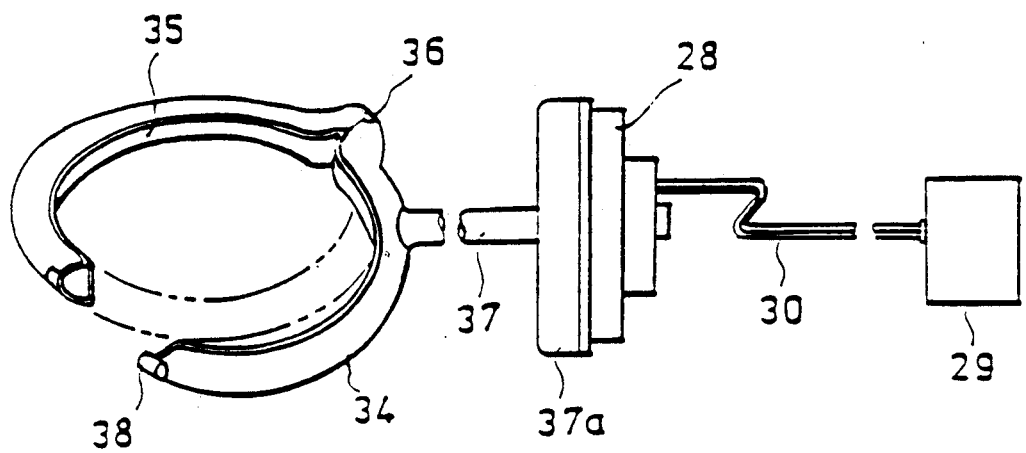
FIG. 13 is the schematic perspective view of a vibrotherapeutic device to vibrostimulate the thoracicoabdominal site in human body.

The embodiment as shown in FIG. 13 is to entirely vibrate the thoracicoabdominal site of human body. In this embodiment, vibratile circular tube (34) comprising a rigid outside wall and vibratile elastic inside wall (35) provided along with the outside wall, and vibrator system (28) are interconnected with flexible hose (37) through pressure room (37a), while the inside space of vibratile circular tube (34) and flexible hose (37) is filled with an oil so that the vibration occurred at the vibratile plate of vibrator system (28) is transmitted through the oil to actuate vibratile elastic inside wall (35). The inside space of flexible hose (37) can be filled with gases and liquids excluding oil.

Vibratile circular tube (34) is prepared into two divisible sections in a circular arc shape, and the division point of one section is equipped with hinge (36), while the division point of the other section is equipped with engaging member (38), so that these sections are openably engaged at hinge (36) as the fulcrum. The structure of this embodiment should not be restricted to the disclosed one, and a structure that is stretchable in accordance with the body size of the subject can be advantageously used to ensure a better fitness. As in the case of treating asthma, when one subject can personally use one vibrotherapeutic device, vibratile circular tube (34) can be prepared to attain a much better fitness.

In use, vibratile circular tube (34) is attached around the subject's breast or belly, and the subject is allowed to settle down in a lounge chair, after which vibrator system (28) is actuated at a prescribed frequency to effect a vibrostimulation. Thus, asthmatic spasms can be quickly relieved and stopped.

Since the most efficacious frequency is slightly variable with particular subject, it is recommendable first to stimulate the subject's body at a standard frequency, for example, 65 hertz, then to chose the most efficacious frequency while carefully monitoring the state of the subject.

The vibrotherapeutic device exerts superior effects in relieving and stopping pains and spasm in asthma, thoracico-abdominal myalgia and lumbago, as well as in relieving and improving blood circulation and fatigue in muscle.

When the subject is in a healthy condition, the vibrotherapeutic device can be used for shortening the sleep latency to induce a restful sleep, as well as for mentally and physically relaxing the subject.

Figure 14:
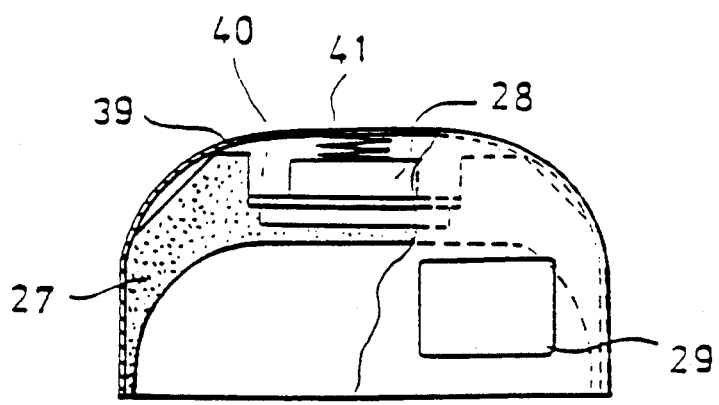
FIG. 14 is the partially cutaway side elevation view of a vibrotherapeutic device to vibrostimulate the head.

The embodiment as shown in FIG. 14 is a vibrotherapeutic device that is put on the head when in use. Sponge member (27) that has a concave conforming to the subject's head is attached to the inside wall of helmet member (39). Vibrator system (28) is inserted in hole (40), provided through sponge member (27), in such manner that the vibratile plate of vibrator system (28) locates downwardly. The upper side of vibrator system (28) is elastically supported with spring (41) provided at the inside bottom of helmet member (39). Driver system (29) is attached to the outside wall of helmet member (39) in order to actuate vibrator system (28) at a frequency, for example, of 10-150 hertz.

The vibrotherapeutic device can be used to massage the scalp by putting it on the subject's head, and vibrostimulating the subject's head. Such massage helps to improve the blood circulation, and this is effective in the shortening of sleep latency, dehypnotization, relief of pains in headache, mental and physical relaxation, promotion of the regeneration and growth of hair, and prevention of the losing of hair.

When the scalp is first applied with a hair restorer such as KANKHO-SO 310, a trademark of 6-[2-[ [5-bromo-2-pyridyl]amino]vinyl]-1-ethyl-2-picolinium iodide commercialized by Nippon Kankho-Shikiso Kenkyujo Co., Ltd., Okayama, Japan, and then vibrostimulated with the vibrotherapeutic device, a much higher promoting effect can be attained in the regeneration and growth of hair.

Since the vibrotherapeutic device is effective in dehypnotization as well as in the shortening of sleep latency, it can be advantageously used to ensure safety driving by allowing a car driver to wear the device to prevent driving asleep.

The vibrotherapeutic device is also effective in converting brain wave into the alpha rhythm when operated at a frequency of about 10 hertz.

As described above, the vibrator system according to the invention is characterized in that it can attain a satisfactorily high energy efficiency, as well as that it never arises a large operation noise.

Furthermore, the vibrator system according to the invention can be easily miniaturized because in the system the vibration occurs at the output shaft of an ultrasonic motor.

Since the vibrator system according to the invention never becomes unwieldly, it can be freely assembled in various supporting members in an appropriate shape, for example, blancket, "futon", "zabuton", mattress, vest, "tanzen", belt, "obi", cap, hat, slippers, shoes, helmet, chair, bed, mat, bed sheet, cushion and driver's seat to locally or systemically vibrostimulate human body. Such vibrostimulation helps to relax and improve the muscle and blood circulation, and this is superiorly effective in the shortening of sleep latency, dehypnotization, relief of pains and spasm in myalgia, lumbago, arthritis, rheumatism and asthma, promotion of the regeneration and growth of hair, prevention of the losing of hair, mental and physical relaxation, and warming-up and massaging before and after playing sports.

The vibrotherapeutic device according to the invention can administer an effective vibrostimulation to human body without consuming a large amount of electric energy because it uses ultrasonic motor as the power source.

Furthermore, since the vibrotherapeutic device according to the invention uses ultrasonic motor as the power source, its vibration never stops when loaded with human body.

In addition, since the vibrotherapeutic device according to the invention uses ultrasonic motor as the power source, it can stimulate the subject's body with a vibration having a pulse waveform.

While the described embodiments represent the preferred forms of the present invention, it is to be understood that modifications and variations will occur to those skilled in the art without departing from the spirit of the invention. The scope of the invention therefore to be determined solely by the appended claims.

We claim:

1. A vibrator system, comprising:
   an ultrasonic motor comprising a stator, an electrode divided into at least two sections, and a rotator having an output shaft, said rotator being placed in parallel to said electrode;

a driver circuit which supplies forwardly rotary and reversely-rotatory signals to each section of said electrode; and a switching control circuit which alternately switches the signals so that each section of said electrode alternately receives the forwardly-rotatory and reversely-rotatory signals, whereby a vibration is generated at the output shaft of said ultrasonic motor.

2. The vibrator system of claim 1, wherein said ultrasonic motor is of travelling wave type.

3. The vibrator system of claim 1, wherein said driver circuit comprises:

a high-frequency voltage source connected with one section of the electrode;

a phase converter circuit through which a second section of said electrode is connected with said high-frequency voltage source; and an antiphase converter circuit through which the second section of said electrode is connected with the high-frequency voltage source.

4. The vibrator system of claim 1, wherein said switching control circuit comprises a forward and reverse switching circuit.

5. The vibrator system of claim 4, wherein a pulse signal from an oscillator is inputted to the forward and reverse switching circuit.

6. The vibrator system of claim 1, wherein said switching control circuit comprises a phase control circuit.

7. The vibrator system of claim 1, wherein one end of said arm member is fixed to said output shaft and the other end of the arm member is attached to a vibratile plate while supporting the latter end with an elastic member.

8. The vibrator system of claim 1, wherein an inertial member is attached to the output shaft, while a cover member which covers the inertial member is attached to a case of the ultrasonic motor through a damping member.

9. The vibrator system of claim 1, wherein a diaphragm is attached to the output shaft, while the peripheral edge of the diaphragm is fixed to a supporting plate attached to a case of the ultrasonic motor.

10. The vibrator system of claim 1, which additionally contains an inertial disc attached to the output shaft, and a diaphragm whose center and peripheral part are fixed respectively to the output shaft and a case of the ultrasonic motor.

11. The vibrator system of claim 10, wherein an elastic member is interposed between the output shaft, and the inertial disc and the diaphragm.

12. The vibrator system of claim 10, wherein the bottom surface of the diaphragm is in contact with the inertial disc.

13. The vibrator system of claim 1, which is assembled in a member selected form the group consisting of mat, belt and helmet, and wherein a subject's body is vibro-stimulated through an elastic member.

14. The vibrator system of claim 1, which contains a vibratile plate and a tubular path filled with a fluid so that a vibration generated at the output shaft is communicated to the vibratile plate through the tubular path.

15. The vibrator system of claim 1, wherein the frequency of the vibration is in the range of 10-150 hertz.

16. The vibrator system of claim 1, wherein the vibration possesses a pulse waveform.

* * * * *